US008720529B2

(12) United States Patent
Suzuki et al.

(10) Patent No.: US 8,720,529 B2
(45) Date of Patent: May 13, 2014

(54) HEAT EXCHANGER HAVING A PARTITION MEMBER FOR USE IN A VEHICULAR AIR CONDITIONING APPARATUS, AND A VEHICULAR AIR CONDITIONING APPARATUS INCLUDING THE HEAT EXCHANGER

(75) Inventors: Hiroto Suzuki, Tochigi-ken (JP); Tatsunori Arai, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 1187 days.

(21) Appl. No.: 12/636,149

(22) Filed: Dec. 11, 2009

(65) Prior Publication Data

US 2011/0138850 A1    Jun. 16, 2011

(51) Int. Cl.
*B60H 1/00*    (2006.01)
*F28F 7/00*    (2006.01)
*B21D 53/02*    (2006.01)

(52) U.S. Cl.
USPC ............... 165/42; 165/79; 165/82; 29/890.03

(58) Field of Classification Search
USPC ............ 165/41, 42, 43, 44, 69, 79, 81, 82, 83
See application file for complete search history.

(56) References Cited

U.S. PATENT DOCUMENTS

| | | | | |
|---|---|---|---|---|
| 4,559,994 A * | 12/1985 | Waldmann et al. | ............... | 165/41 |
| 4,791,982 A * | 12/1988 | Meyerhofer | ................... | 165/148 |
| 5,309,731 A | 5/1994 | Nonoyama et al. | | |
| 5,690,166 A * | 11/1997 | Yamaguchi | ....................... | 165/96 |
| 6,055,360 A * | 4/2000 | Inoue et al. | .................... | 392/485 |
| 6,265,692 B1 * | 7/2001 | Umebayahi et al. | ............ | 165/41 |
| 6,308,770 B1 | 10/2001 | Shikata et al. | | |
| 6,341,648 B1 * | 1/2002 | Fukuoka et al. | ............... | 165/174 |
| 6,814,137 B2 * | 11/2004 | Tsurushima et al. | ........... | 165/42 |
| 6,854,513 B2 * | 2/2005 | Shirota et al. | .................... | 165/42 |
| 7,018,171 B2 * | 3/2006 | Wang et al. | ...................... | 415/98 |
| 7,063,612 B2 * | 6/2006 | Kaszycki | ....................... | 454/121 |
| 7,448,440 B2 * | 11/2008 | Ichiyanagi et al. | ........... | 165/174 |
| 7,703,282 B1 * | 4/2010 | Meissner et al. | ................ | 165/41 |
| 7,775,263 B2 * | 8/2010 | Han | ............................... | 165/176 |
| 7,927,684 B2 * | 4/2011 | Comeaux et al. | .............. | 428/137 |
| 8,020,524 B2 * | 9/2011 | Miyagawa | ........................ | 165/81 |
| 8,267,155 B2 * | 9/2012 | Katsuki et al. | ................... | 454/69 |
| 8,267,165 B2 * | 9/2012 | Nanaumi et al. | ................ | 165/41 |
| 8,382,563 B2 * | 2/2013 | Sievers et al. | ................... | 454/126 |
| 8,403,029 B2 * | 3/2013 | Nanaumi et al. | ................ | 165/42 |
| 8,443,872 B2 * | 5/2013 | Seto | ............................... | 165/202 |
| 8,443,873 B2 * | 5/2013 | Nanaumi et al. | ................ | 165/42 |
| 8,459,337 B2 * | 6/2013 | Seidler et al. | .................... | 165/81 |
| 2007/0131398 A1 * | 6/2007 | Ichiyanagi et al. | ........... | 165/153 |
| 2011/0073273 A1 * | 3/2011 | Seto | ............................... | 165/42 |
| 2012/0024509 A1 * | 2/2012 | Ueno | ............................. | 165/173 |

FOREIGN PATENT DOCUMENTS

JP      9-104216      4/1997

* cited by examiner

*Primary Examiner* — Ljiljana Ciric
(74) *Attorney, Agent, or Firm* — Rankin, Hill & Clark LLP (57) ABSTRACT

A heat exchanger for use in a vehicular air conditioning apparatus, including a plurality of first and second tubes; a first heat exchanger section, a boundary portion, and a second heat exchanger section; a plurality of first fins disposed on the first heat exchanger section and a plurality of second fins disposed on the second heat exchanger section; and a partition member formed at the boundary portion, wherein the partition member is made of a synthetic resin or synthetic rubber and in contact with the plurality of the first and second tubes and end surfaces of the plurality of the first and second fins at the boundary portion such that the partition member blocks the air from flowing between the first heat exchanger section and the second heat exchanger section.

10 Claims, 11 Drawing Sheets

HEAT EXCHANGER HAVING A PARTITION MEMBER FOR USE IN A VEHICULAR AIR CONDITIONING APPARATUS, AND A VEHICULAR AIR CONDITIONING APPARATUS INCLUDING THE HEAT EXCHANGER

BACKGROUND OF THE INVENTION

1. Field of the Invention

The present invention relates to a heat exchanger, which is installed in a vehicular air conditioning apparatus that performs temperature adjustment of a vehicle compartment, whereby the heat exchanger is used by the vehicular air conditioning apparatus for cooling and heating air that is blown into the vehicle compartment. The present invention also concerns a partitioning method for such a heat exchanger, for forming a partition member that partitions the interior of the heat exchanger.

2. Description of the Related Art

In a vehicular air conditioning apparatus that is mounted in a vehicle, for example, it is known to provide a first blower for the purpose of taking in air from the vehicle compartment into the casing, and a second blower for the purpose of taking in internal and external air with respect to the vehicle into the casing. In such a vehicular air conditioning apparatus, air that is introduced from an internal air introduction port by rotation of the first blower is heated by a first heat exchanger and then is blown into the vehicle compartment through a first air passage from the face blow-out port or the foot blow-out port. In addition, air that is introduced from an external air introduction port by rotation of the second blower is heated by a second heat exchanger and then is blown into the vehicle compartment through a second air passage from the defroster blow-out port.

With the aforementioned vehicular air conditioning apparatus, for example, as disclosed in Japanese Laid-Open Patent Publication No. 09-104216, respective partitioning plates are provided on upstream and downstream sides of the heat exchanger, which correspond respectively to ventilation passages therein. By means of the partition plates, one of such ventilation passages and the other of such ventilation passages are separated (partitioned) from each other. Together therewith, by arranging the partition plates on a straight line with any one of a plurality of tubes that constitute the heat exchanger, air that flows through one of the ventilation passages is separated in the heat exchanger from air that flows through the other of the ventilation passages.

However, using the aforementioned technique, for example, in the case that the technique is applied to a heat exchanger having two layers of tubes, within the heat exchanger, air still passes and flows between one set of the tubes, which are arranged on a front surface side, and the other set of tubes, which are arranged on the rear surface side of the heat exchanger.

Consequently, with a heat exchanger having such a two-layered arrangement of tubes, air which flows through one or the other of the ventilation passages and flows into the heat exchanger tends to flow from a passage in which the air flow rate is abundant, and which is high in pressure, toward the side of a passage in which the air flow rate is smaller and which has a relatively low pressure. As a result, the air inside each of the passages on the downstream side of the heat exchanger does not obtain desired airflow rates, so that ultimately, the mixing ratio between cool air and warm air becomes altered. Also, the air, which is blown out from each of the blow-out ports inside the vehicle compartment, is not capable of achieving a desired temperature and blowing rate.

Further, in the case that the ventilation passages are divided by the aforementioned partition plate into first and second individual ventilation passages, for example, in the interior of the heat exchanger, air that passes through small gaps between the partition plate and the tubes tends to leak out to the ventilation passage on the other side. Thus, there has been a demand to carry out blowing of air into the vehicle compartment at desired flow rates, by reliably suppressing the occurrence of such air leakage.

SUMMARY OF THE INVENTION

A general object of the present invention is to provide a heat exchanger for use in a vehicular air conditioning apparatus, and a partitioning method for the heat exchanger, which is capable, by means of a simple structure, of reliably partitioning air that is supplied to first and second passages in the vehicular air conditioning apparatus, and of reliably blowing the air, respectively and independently, into the interior of a vehicle compartment from predetermined blow-out ports.

In order to achieve the aforementioned object, the present invention is characterized by a heat exchanger for use in a vehicular air conditioning apparatus having a casing including first and second passages through which air flows, and a damper mechanism for switching a flow state of the air in the first and second passages, and first and second blowers for supplying air respectively to the interior of the casing, wherein the heat exchanger is disposed in the interior of the casing so as to straddle between the first passage and the second passage, for thereby cooling and heating the air, and supplying the air. The heat exchanger includes:

a plurality of tubes through which a medium flows in the interior thereof;

fins disposed on a first heat exchanger section and a second heat exchanger section, the fins being bent in a wavy shape between the tubes and having air holes therein through which the air flows, for carrying out heat exchange respectively on the air that flows through the first and second passages inside the casing; and a partition member, which is packed between the first heat exchanger section and the second heat exchanger section, wherein the partition member blocks the air from flowing between the first heat exchanger section and the second heat exchanger section.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
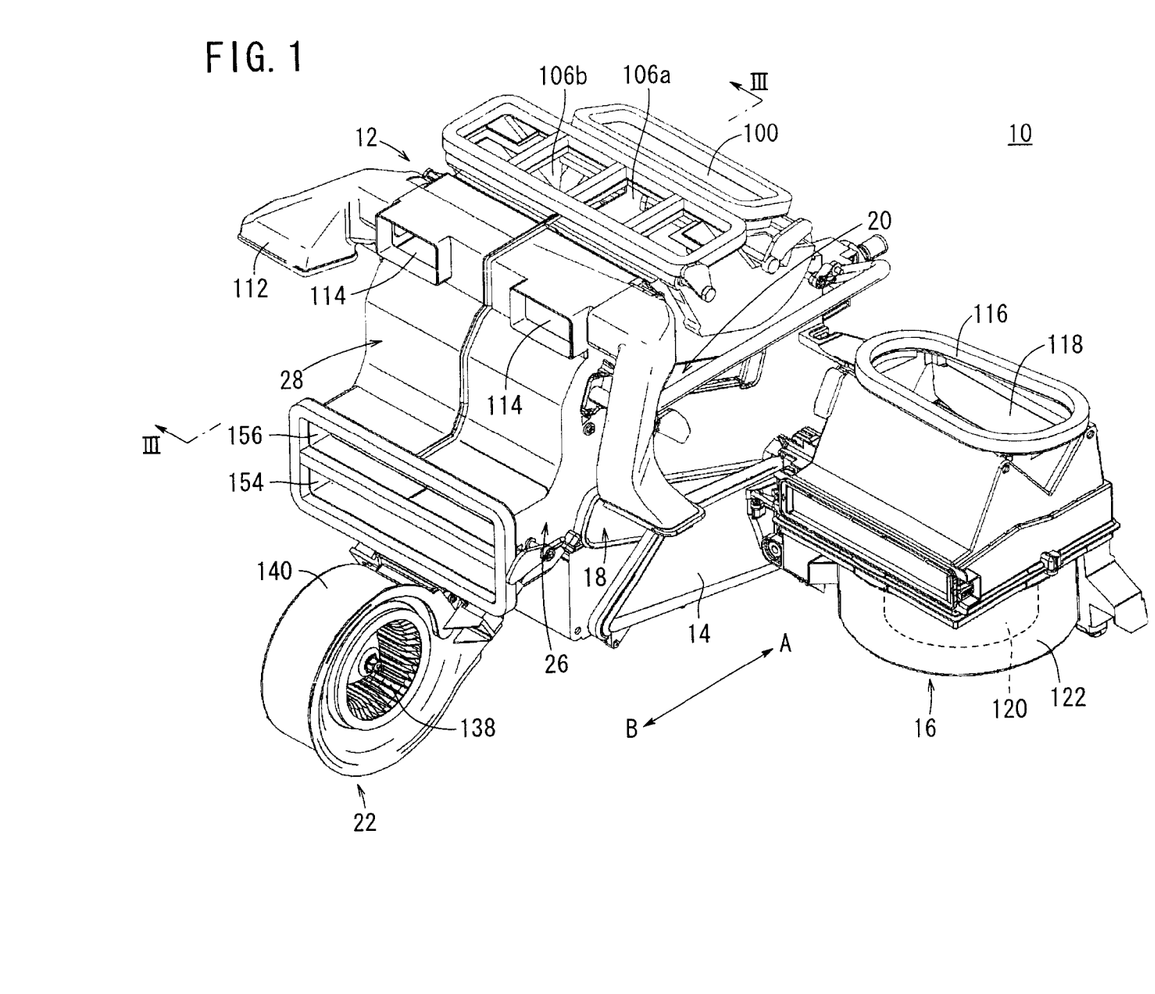
FIG. 1 is an external perspective view of a vehicular air conditioning apparatus to which a heat exchanger is applied according to an embodiment of the present invention.

In FIG. 1, reference numeral 10 indicates a vehicular air conditioning apparatus to which a heat exchanger is applied according to an embodiment of the present invention. The vehicular air conditioning apparatus 10, for example, is installed in a vehicle having three rows of seats arranged along the direction of travel of the vehicle. In the following descriptions, the first row of seats in the vehicle compartment of the vehicle is designated as front seats, the second row of seats is designated as middle seats, and the third row of seats is designated as rear seats.

Figure 2:
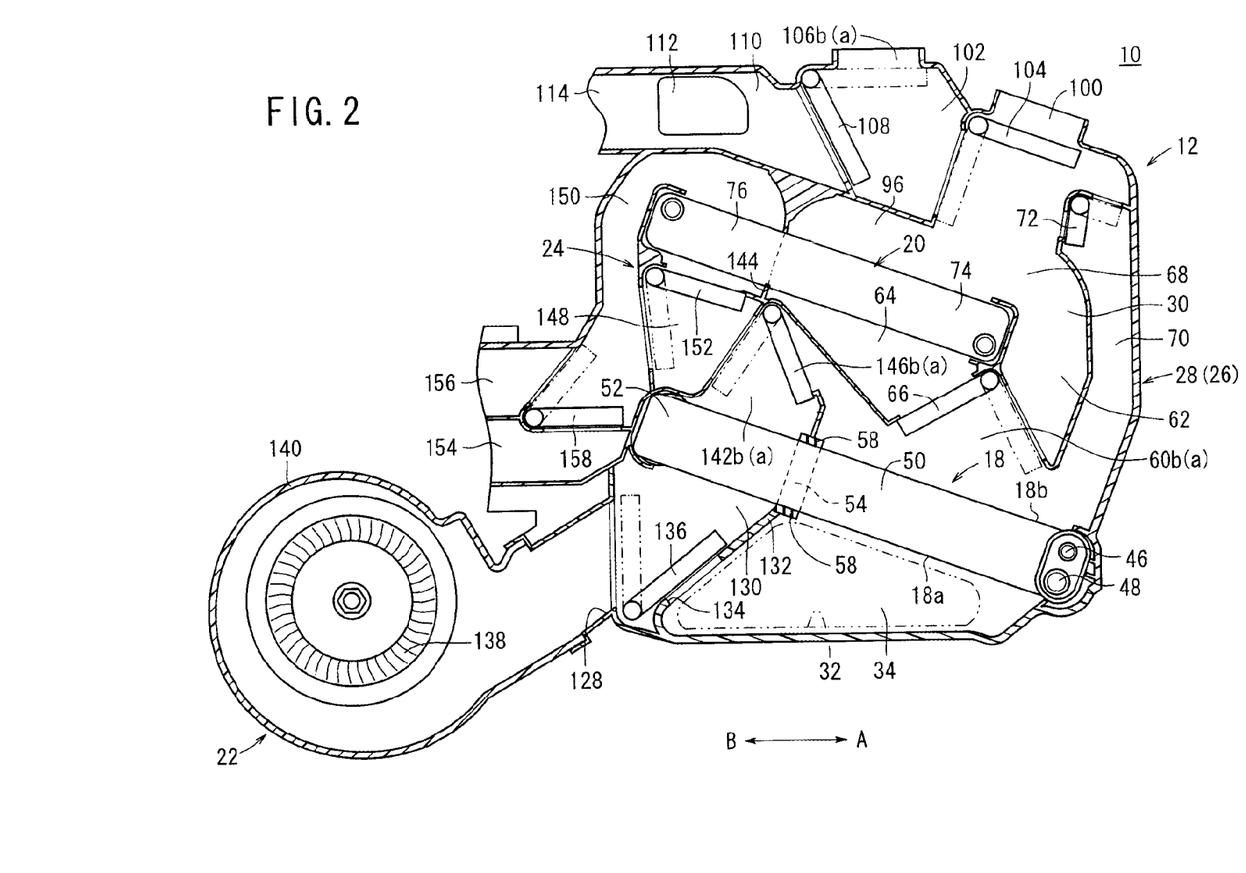
FIG. 2 is an overall cross sectional view of the vehicular air conditioning apparatus shown in FIG. 1.

Further, the vehicular air conditioning apparatus 10 is installed so that the righthand side thereof shown in FIG. 2 (in the direction of arrow A) is oriented toward the front side of the vehicle, whereas the lefthand side (in the direction of arrow B) is oriented toward the rear side of the vehicle. The arrow A direction shall be described as a forward direction, whereas the arrow B direction shall be described as a rearward direction.

In the present embodiment, inside a casing 12, plural rotating members made up of dampers or the like are provided, wherein the rotating members are operated by rotational drive sources such as motors or the like. For purposes of simplification, depictions and explanations concerning such rotational drive sources have been omitted.

Figure 3:
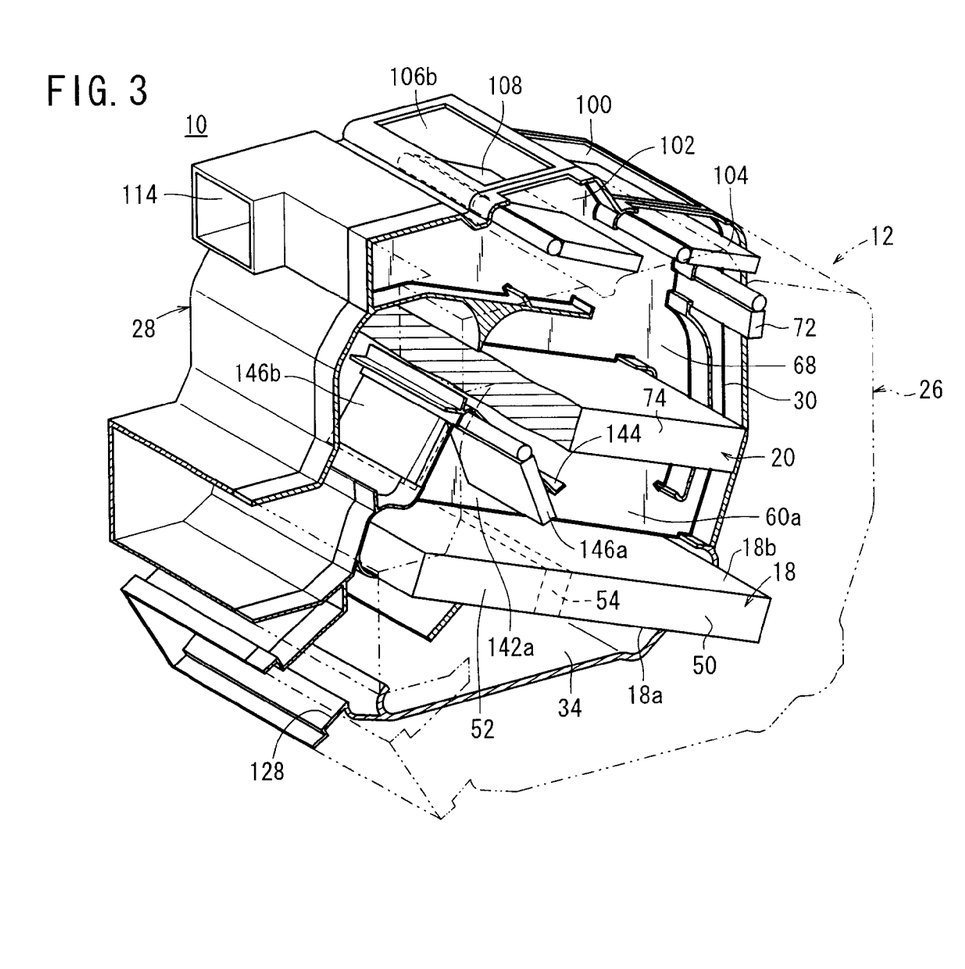
FIG. 3 is a cross sectional perspective view taken along line III-III of FIG. 1.

As shown in FIGS. 1 to 3, the vehicular air conditioning apparatus 10 includes the casing 12 constituted by respective air passages, a first blower unit 16 connected through a connection duct 14 to a side portion of the casing 12 for blowing air toward the front seat side of the vehicle, an evaporator (heat exchanger) 18 arranged inside the casing 12 for cooling air, a heater core (heat exchanger) 20 for heating air, a second blower unit 22 connected to a lower portion of the casing 12 for taking in air from inside the vehicle compartment (interior air) and blowing the air toward the rear seats of the vehicle, and a damper mechanism 24 for switching the flow of air that flows through and inside each of the respective passages.

The casing 12 is constituted by first and second divided casings 26, 28 having substantially symmetrical shapes, wherein a center plate 30 is disposed between the first divided casing 26 and the second divided casing 28. The connection duct 14 is connected on a lower side portion of the first divided casing 26, and a first intake port 32 is formed through which air is supplied from the first blower unit 16. The first intake port 32 communicates with a first front passage (first passage) 34 disposed on an upstream side of the evaporator 18.

The evaporator 18 is disposed so as to straddle between the first divided casing 26 and the second divided casing 28. One end of the evaporator 18 in the forward direction (the direction of arrow A) of the vehicle is inclined downward at a predetermined angle with respect to the other end thereof in the rearward direction of the vehicle.

In the evaporator 18, as shown in FIGS. 4 to 7, a pair of first and second tubes 36a, 36b are formed, for example, from thin plates of aluminum or the like, and first and second fins 38a, 38b, which are bent in a serpentine undulating shape, are disposed respectively between the stacked first and second tubes 36a, 36b. A plurality of louvers (air holes) 40 are formed in the first and second fins 38a, 38b, which are cutout and bent at a predetermined angle with respect to planar surfaces of the first and second fins 38a, 38b.

By causing a coolant medium to flow through the interior of the first and second tubes 36a, 36b, air that passes through the louvers 40 and flows between the first and second fins 38a, 38b is cooled by the coolant medium and is supplied to the downstream side as chilled air.

Figure 4:
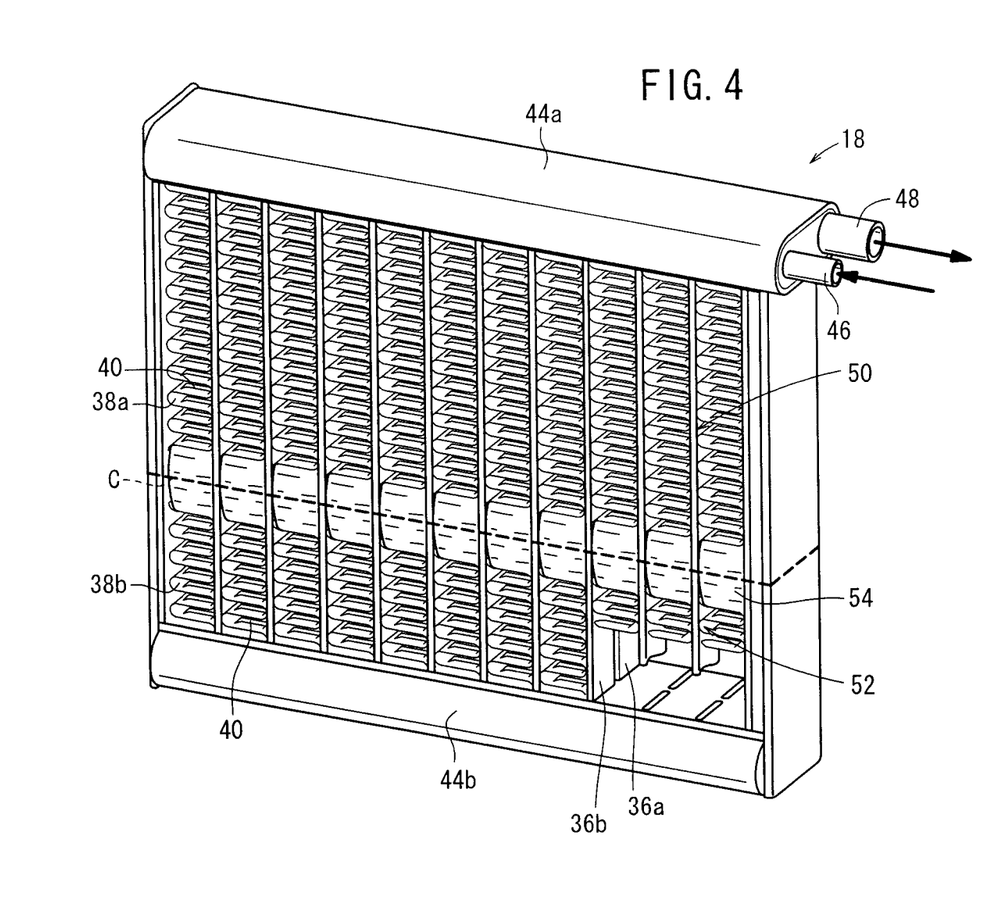
FIG. 4 is an exterior perspective view of an evaporator shown in FIG. 2.
Figure 5:
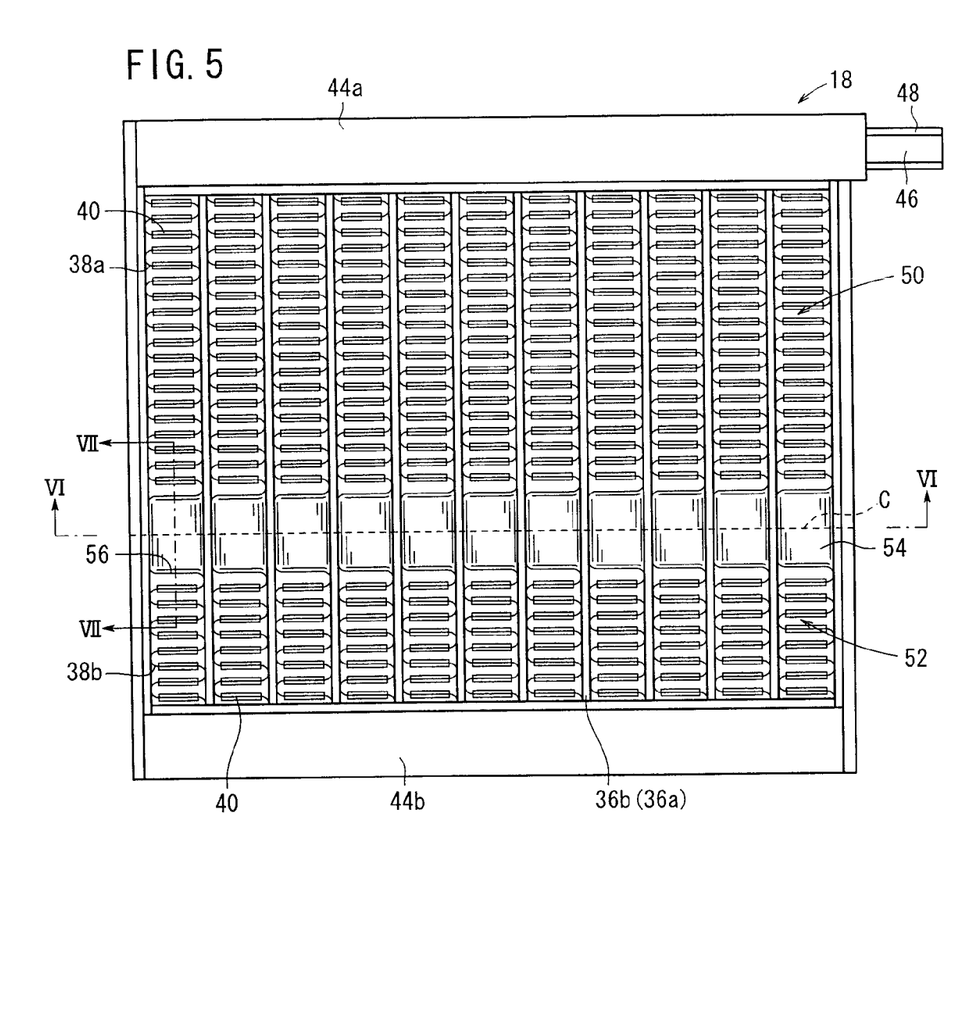
FIG. 5 is a plan view of the evaporator of FIG. 4.

As shown in FIG. 4, the paired first and second tubes 36a, 36b are arrayed in parallel and arranged in two layers in the thickness direction of the evaporator 18. Gaps 42 having predetermined intervals are disposed between the first tubes 36a and the second tubes 36b.

Further, in the evaporator 18 on both ends of the first and second tubes 36a, 36b, respective hollow tank portions 44a, 44b are connected, which retain a coolant medium that flows inside the first and second tubes 36a, 36b. In addition, on one of the tank portions 44a, a supply conduit 46 through which the coolant medium is supplied from the exterior, and a discharge conduit 48 through which the coolant medium having circulated through the interior of the evaporator 18 is discharged, are connected respectively.

Furthermore, as shown in FIG. 1, the evaporator 18 includes a first cooling section (first heat exchanger section) 50, which faces the first front passage 34 and cools air supplied from the first blower unit 16, and a second cooling section (second heat exchanger section) 52, which faces a later-described first rear passage (second passage) 130 and cools air supplied from the second blower unit 22. The first cooling section 50 is arranged forwardly (in the direction of the arrow A) of the casing 12, whereas the second cooling section 52 is arranged rearwardly (in the direction of the arrow B) of the casing 12. The first fins 38a are disposed on the first cooling section 50, and the second fins 38b are disposed on the second cooling section 52.

Figure 6:
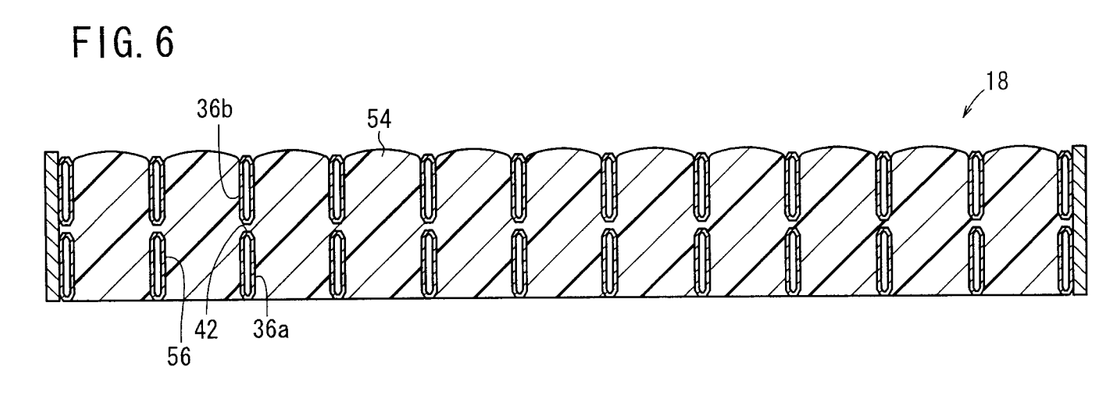
FIG. 6 is a cross sectional view taken along line VI-VI of FIG. 5.
Figure 7:
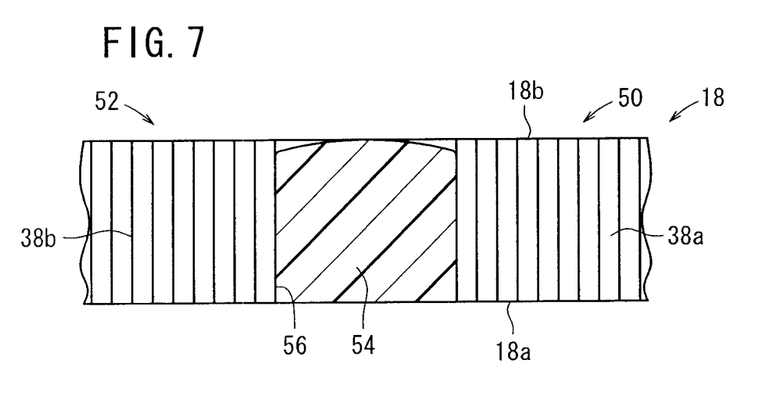
FIG. 7 is a schematic cross sectional view taken along line VII-VII of FIG. 5.

A partition member 54, which blocks communication of air between the first cooling section 50 and the second cooling section 52, is disposed at a boundary portion C of the first cooling section 50 and the second cooling section 52. The partition member 54 is formed by a packing agent L, for example, made up from a resin material, rubber or the like, and as shown in FIG. 6, is disposed between the pair of first and second tubes 36a, 36b, and further as shown in FIG. 7, is disposed in spaces 56 between the first fins 38a and the second fins 38b.

The packing agent L, for example, may be a synthetic resin or synthetic rubber which exhibits thermoplasticity, having a characteristic such that it may be softened by heating and then hardened upon cooling thereof, which includes an olefin resin, silicone resin, urethane resin, or ethylene-vinyl acetate (EVA) copolymer resin, or the like. In addition, after the packing agent L has been filled into the space 56, the partition member 54 becomes fixed at the boundary portion C by hardening of the packing agent L.

Further, the partition member 54 is formed integrally along the thickness direction of the evaporator 18, from a front surface 18a side of the evaporator 18 that faces the first front passage 34 and the first rear passage 130, to a rear surface 18b of the evaporator 18 that faces second front passages 60a, 60b and second rear passages 142a, 142b. In addition, the partition member 54 is formed in tight contact with edges of the first fins 38a and edges of the second fins 38b, and is affixed in intimate contact with side walls of the first and second fins 38a, 38b.

Owing thereto, the partition member 54 blocks the flow of air through and between the first fins 38a and the second fins 38b, and further, blocks air from flowing through the gaps 42 that are formed between the first tubes 36a and the second tubes 36b. Moreover, sealing members 58 are disposed on the surfaces of the partition member 54 between first and second dividing walls 132, 144 that are formed in the casing 12. By abutment of the sealing member 58 against the partition member 54, leakage of air that would otherwise flow between the first dividing wall 132 and the evaporator 18 and between the second dividing wall 144 and the evaporator 18 is prevented from occurring.

On the other hand, as shown in FIGS. 1 to 3, on a downstream side of the evaporator 18, the second front passages 60a, 60b are formed, through which air having passed through the first cooling section 50 is supplied. Upwardly of the second front passages 60a, 60b, a third front passage 62 and a fourth front passage 64 are formed in a branching or bifurcated manner. Further, in the second front passages 60a, 60b, a first air mixing damper 66 is rotatably disposed so as to face toward the branching portion of the third front passage 62 and the fourth front passage 64.

Additionally, by rotation of the first air mixing damper 66, the blowing condition and blowing rate of cooled air that has passed through the evaporator 18 into the third front passage 62 and the fourth front passage 64 is adjusted. The third front passage 62 is arranged on the forward side (the direction of arrow A), whereas the fourth front passage 64 is arranged on the rearward side (the direction of arrow B) of the casing 12. The heater core 20 is disposed on a downstream side of the fourth front passage 64.

Further, on the forward side (in the direction of arrow A) of the third front passage 62, a bypass passage 70 is formed, which extends along the third front passage 62 and supplies air to a later-described mixing section 68 from the downstream side of the evaporator 18, and a bypass damper 72 is disposed on a downstream side of the bypass passage 70. The bypass passage 70 is provided to supply cool air cooled by the evaporator 18 directly to the downstream side under a switching action of the bypass damper 72.

The heater core 20, similar to the evaporator 18, is disposed so as to straddle between the first divided casing 26 and the second divided casing 28. One end of the heater core 20 in the forward direction (the direction of arrow A) of the vehicle is inclined downward at a predetermined angle with respect to the other end thereof in the rearward direction (the direction of arrow B) of the vehicle.

The heater core 20 includes a first heating section (first heat exchanger) 74, which faces the fourth front passage 64 and heats air supplied from the fourth front passage 64, and a second heating section (second heat exchanger) 76, which faces third rear passage 148 and heats air supplied from the third rear passage 148. In addition, at a boundary portion between the first heating section 74 and the second heating section 76, a non-illustrated partitioning means is disposed, which blocks the flow of air between the first heating section 74 and the second heating section 76.

More specifically, air that flows through the first heating section 74 and air that flows through the second heating section 76 are prevented from intermixing at the interior of the heater core 20 by the partitioning means. Moreover, as the aforementioned partitioning means, a partitioning means which is the same as the partition member 54 applied to the evaporator 18 may be provided.

On the downstream side of the heater core 20, a fifth front passage 96 is formed. The fifth front passage 96 extends in the forward direction, and at a location that merges with a downstream side of the third front passage 62, the mixing section 68 is formed, in which cooled air supplied through the third front passage 62 and warmed air supplied through the fifth front passage 96 are mixed.

A defroster blow-out port 100 opens upwardly of the mixing section 68, and to the side of the mixing section 68, a rearwardly-extending sixth front passage 102 is formed.

Further, in the mixing section 68, a defroster damper 104 is rotatably disposed, facing the defroster blow-out port 100. By rotation of the defroster damper 104, the blowing state of air into the defroster blow-out port 100 and the sixth front passage 102 is switched, and the blowing rate thereof is adjusted.

In the sixth front passage 102, first vent blow-out ports 106a, 106b open upwardly, and a vent damper 108 is rotatably disposed facing toward the first vent blow-out ports 106a, 106b and communicating with a seventh front passage 110, which extends further rearwardly. By rotation of the vent damper 108, the blowing state of air is switched when air is blown from the mixing section 68 to the first vent blow-out ports 106a, 106b and the seventh front passage 110, and further, the blowing rate of the air is capable of being adjusted.

The defroster blow-out port 100 and the first vent blow-out ports 106a, 106b open respectively upwardly of the casing 12. The defroster blow-out port 100 is arranged on a forward side (in the direction of arrow A), whereas the first vent blow-out ports 106a, 106b are arranged on the rearward side (in the direction of arrow B), substantially centrally in the casing 12 with respect to the defroster blow-out port 100.

On a downstream side of the seventh front passage 110, a first heat passage 112 is connected, which extends in the widthwise direction of the casing 12 and blows air through a non-illustrated first heat blow-out port in the vicinity of the feet of passengers in the front seats in the vehicle compartment. Together therewith, a second heat passage 114 is connected, which extends rearwardly of the casing 12 and blows air through a second heat blow-out port (not shown) in the vicinity of the feet of passengers in the middle seats inside the vehicle compartment.

The first blower unit 16 includes an intake damper 118 in which a duct 116 for introducing external air is disposed in an inlet opening thereof, for carrying out switching of internal and external air, and a first blower fan 120 for supplying to the interior of the casing 12 air (external air or internal air) that is taken in from the duct 116 or the like. A blower case 122 in which the first blower fan 120 is accommodated communicates with the interior of the casing 12 via the connection duct 14 connected to the first intake port 32. The rotation of the first blower fan 120 is controlled by a blower motor 121, which is driven by supplying electrical power thereto.

In this manner, air supplied from the first blower unit 16 is introduced to the interior of the casing 12 through the connection duct 14 and the first intake port 32, and by rotating actions of the first air mixing damper 66, the defroster damper 104, the vent damper 108 and the bypass damper 72, which collectively make up the damper mechanism 24, air is selectively supplied through the first through seventh front passages 34, 60a, 60b, 62, 64, 96, 102, 110, and the bypass passage 70 into the defroster blow-out port 100, the first vent blow-out ports 106a, 106b and the first and second heat passages 112, 114, which are capable of blowing air to the front and middle seats in the vehicle.

On the other hand, on a lower portion of the casing 12, a second intake port 128 through which air is supplied from the second blower unit 22 is formed on a rearward side (in the direction of arrow B) perpendicular to the first intake port 32. The second intake port 128 opens at a position on an upstream side of the evaporator 18 and communicates with the first rear passage 130.

The first rear passage 130 is separated from the first front passage 34 by the first dividing wall 132, and a rotatable ventilation switching damper (switching damper) 136 is provided between a communication opening 134 formed in the first dividing wall 132 and the second intake port 128. In addition, in the case that a mode is selected in which blowing of air from the second blower unit 22 is halted and blowing of air only from the first blower unit 16 is carried out, by blocking the second intake port 128 by the ventilation switching damper 136 (i.e., the state shown by the two-dot-dash line in FIG. 2), backflowing of air into the second blower unit 22 can be prevented when a portion of the air supplied from the first blower unit 16 passes through the interior of the evaporator 18 and the heater core 20 or the like, and is leaked out to the side of the first through fourth rear passages 130, 142a, 142b, 148, 150.

Figure 8:
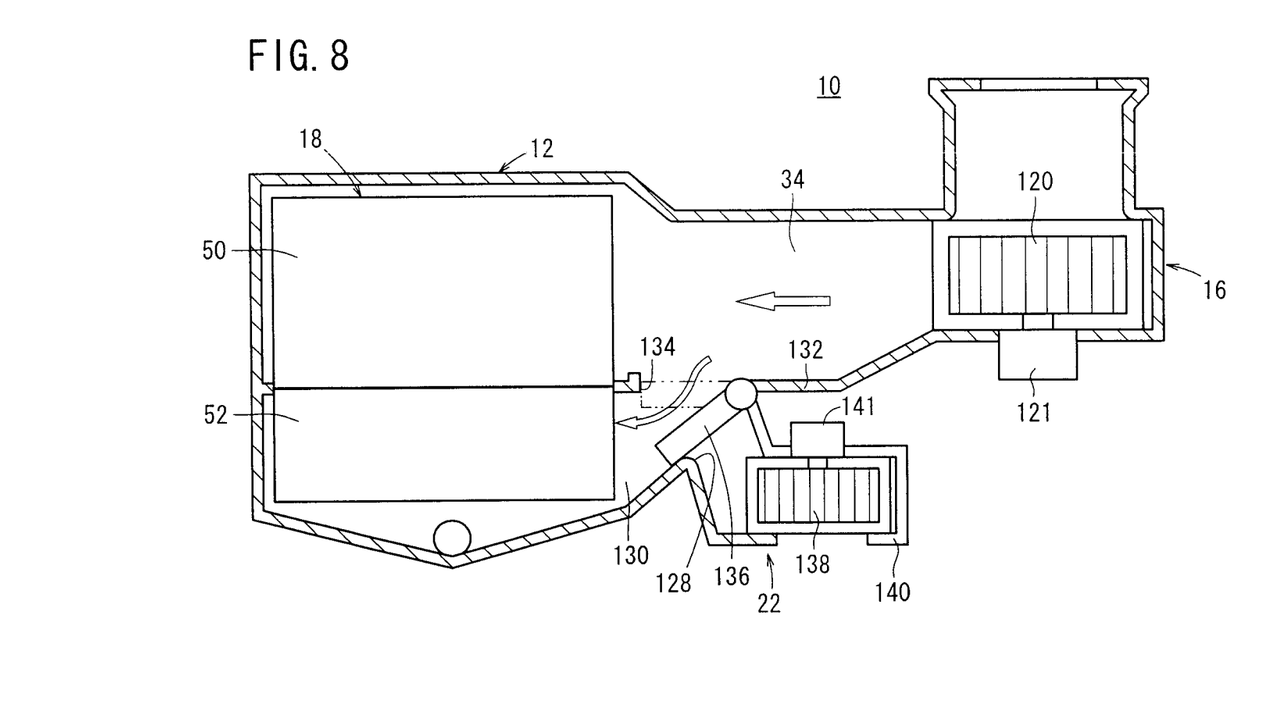
FIG. 8 is an outline schematic view showing a casing, first and second blower units, and an evaporator that constitute the vehicular air conditioning apparatus of FIG. 1.

In this case, as shown in FIG. 8, by rotating the ventilation switching damper 136 to the side of the second intake port 128 and opening the communication opening 134, a portion of the air supplied to the first front passage 34 can be supplied to the side of the first rear passage 130.

As shown in FIGS. 1 and 8, the second blower unit 22 includes a second blower fan 138 that takes in air (internal air) from the vehicle compartment and supplies the intake air to the interior of the casing 12. A blower case 140 in which the second blower fan 138 is accommodated is connected to the second intake port 128 of the casing 12 and communicates with the first rear passage 130. The rotation of the second blower fan 138, similar to the first blower fan 120, is controlled by a second blower motor 141, which is driven by supplying electrical power thereto.

On a downstream side of the first rear passage 130, the second rear passages 142a, 142b are formed to which air that has passed through the second cooling section 52 of the evaporator 18 is supplied. The second rear passages 142a, 142b are separated from the second front passages 60a, 60b by the second dividing wall 144, and the second dividing wall 144 extends to the evaporator 18.

Owing thereto, on a downstream side of the evaporator 18, air that has passed through the first rear passage 130 and flows to the second cooling section 52 of the evaporator 18 does not intermix mutually with air that has passed through the first front passage 34 and flows to the first cooling section 50 of the evaporator 18.

Herein, as shown in FIG. 3, the second rear passages 142a, 142b, the second front passages 60a, 60b and the first vent blow-out ports 106a, 106b are separated respectively on sides of the first and second divided casings 26, 28 about the center plate 30, which is disposed in the center of the casing 12, thereby forming the second rear passage 142a and the second rear passage 142b, the second front passage 60a and the second front passage 60b, and the first vent blow-out port 106a and the first vent blow-out port 106b.

Furthermore, a pair of communication switching dampers 146a, 146b, which are capable of switching a communication state between the second front passages 60a and the second rear passage 142a and between the second front passages 60b and the second rear passage 142b, are disposed in the second rear passages 142a, 142b, respectively, wherein one of the communication switching dampers 146a and the other of the communication switching dampers 146b are rotatably controlled separately and independently from each other.

In addition, by rotation of the pair of communication switching dampers 146a, 146b, the second rear passages 142a, 142b for blowing air to the middle seats and rear seats in the vehicle compartment are placed in communication mutually with the second front passages 60a, 60b for blowing air to the front seats in the vehicle compartment. For example, by changing the rotation amount of one of the communication switching dampers 146a and the rotation amount of the other communication switching damper 146b, respectively, the blowing rate and temperature of air that is blown from the first vent blow-out port 106a through the second front passage 60a to the passenger's side in the front seats, and the blowing rate and temperature of air that is blown from the first vent blow-out port 106b through the second front passage 60b to the driver's side in the front seats, can be controlled separately from each other.

The third rear passage 148 facing the heater core 20 is formed on the downstream side of the second rear passages 142a, 142b. One side of the third rear passage 148 opens into the heater core 20, whereas another side thereof opens onto the side of the adjacent fourth rear passage 150. In addition, a second air mixing damper 152, which mixes at a predetermined mixing ratio the cool air and warm air supplied to the third rear passage 148, thereby producing mixed air, is disposed rotatably in the third rear passage 148. The second air mixing damper 152 switches the communication state between the third rear passage 148 and the upstream or downstream side of the fourth rear passage 150, which is connected to the downstream side of the heater core 20.

Consequently, air cooled by the evaporator 18 and supplied to the third rear passage 148, and air heated by the heater core 20 and that flows to the fourth rear passage 150, are mixed at a predetermined mixing ratio inside the fourth rear passage 150 by rotation of the second air mixing damper 152, and are blown out therefrom. Specifically, an intermediate location of the fourth rear passage 150 functions as the mixing section 68, for mixing cool air and warm air that is blown to the middle seats and rear seats in the vehicle.

The fourth rear passage 150 bends so as to circumvent the other end of the heater core 20 and extends to communicate with fifth and sixth rear passages 154, 156, which branch on a downstream side thereof. A rotatable mode switching damper 158 is disposed at the branching location of the fifth and sixth rear passages 154, 156. The communication state between the fourth rear passage 150 and the fifth and sixth rear passages 154, 156 is switched by rotation of the mode switching damper 158.

The fifth and sixth rear passages 154, 156 extend respectively in the rearward direction (the direction of arrow B) of the vehicle. The fifth rear passage 154 communicates with a second vent blow-out port (not shown) for blowing air in the vicinity of the faces of passengers in the middle seats in the vehicle. On the other hand, the sixth rear passage 156 communicates with third and fourth heat blow-out ports (not shown) for blowing air in the vicinity of the feet of passengers in the middle and rear seats.

More specifically, air supplied from the second blower unit 22 is introduced to the interior of the casing 12 through the second intake port 128, and under rotating actions of the second air mixing damper 152 and the mode switching damper 158, which make up the damper mechanism 24, the air passes through the first through sixth rear passages 130, 142a, 142b, 148, 150, 154, 156 and is supplied selectively to the second vent blow-out port, and the third and fourth heat blow-out ports (not shown), which are capable of blowing air to the middle and rear seats in the vehicle.

The aforementioned second through sixth front passages 60a, 60b, 62, 64, 96, 102, the bypass passage 70 and the second rear passages 142a, 142b are disposed respectively so as to straddle between the first divided casing 26 and the second divided casing 28. However, these passages also are divided by the center plate 30, which is disposed in the center of the casing 12.

The vehicular air conditioning apparatus 10 to which the heat exchanger according to the embodiment of the present invention is applied is basically constructed as described above. Next, the partition member 54 formed with respect to the evaporator 18, which functions as the above-described heat exchanger, shall briefly be explained.

Figure 9:
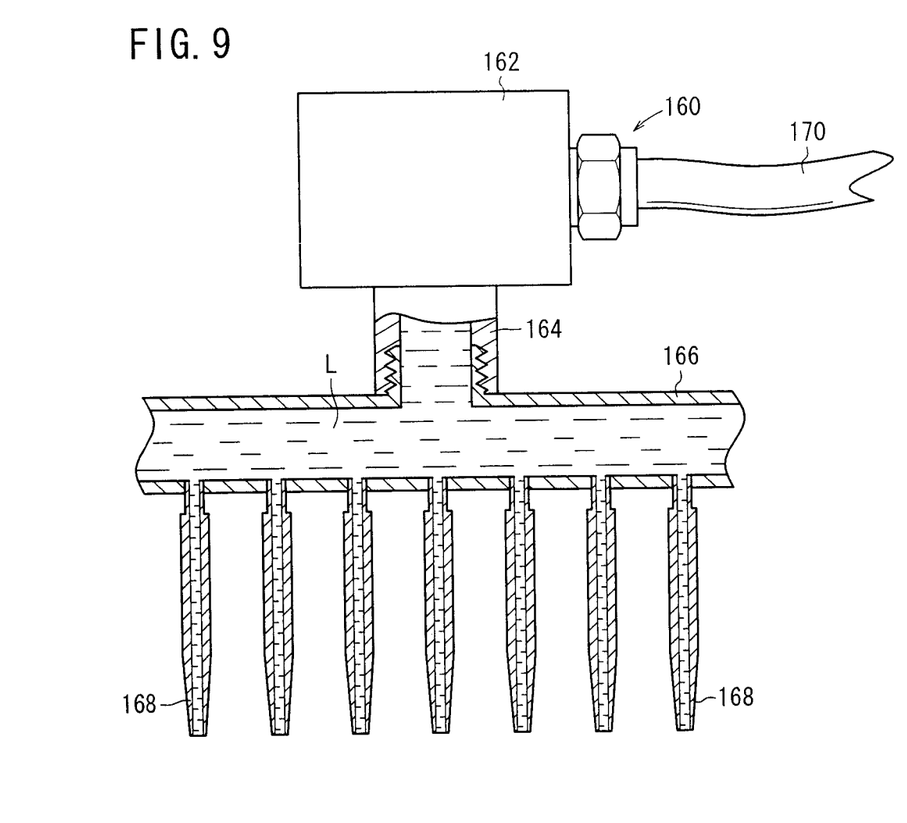
FIG. 9 is a partial outline cross sectional view showing a filling used for filling a packing agent.

An explanation shall be given concerning a filling tool 160, which is used at the time of forming the partition member 54 at the boundary portion C of the evaporator 18. The filling tool 160, as shown in FIG. 9, includes a main body portion 162, a distributor 166 connected via a connector 164 to a lower part of the main body portion 162, and a plurality of supply nozzles 168, which are separated at equal intervals from each other and disposed at a lower portion of the distributor 166. Additionally, the filling tool 160 is installed on a non-illustrated robot arm, so as to be movable in both horizontal and vertical directions.

A supply pipe 170 for supplying the packing agent L from a non-illustrated packing agent supply source is connected to a side surface of the main body portion 162, whereby the packing agent L is supplied to the interior of the main body portion 162 through the supply pipe 170. The packing agent L, for example, is heated to a predetermined temperature by a non-illustrated heater or the like, whereby the packing agent is supplied to the filling tool 160 in a softened flowable state.

Further, the distributor 166 has a predetermined length along the longitudinal direction and extends in a horizontal direction in a state of being connected to the connector 164 at a center portion thereof. Together therewith, the supply nozzles 168 are connected respectively to a lower surface side, on an opposite side from the upper surface thereof, which is connected to the connector 164.

The supply nozzles 168 are formed in cylindrical shapes and project by predetermined heights downwardly with respect to the distributor 166, the ends of the supply nozzles 168 being reduced in diameter slightly in a downward direction in a tapering form. In addition, the supply nozzles 168 communicate with the interior of the main body portion 162 through the interiors of the distributor 166 and the connector 164.

Further, the supply nozzles 168 are provided so as to be the same in number (e.g., eleven nozzles) as the spaces 56 in the evaporator 18, and the intervals between the supply nozzles 168 are arranged such that when the filling tool 160 confronts the spaces 56 in the evaporator 18, and more specifically confronts the evaporator 18 from above, the supply nozzles 168 are disposed respectively at given intervals and at positions so as to be capable of insertion into the centers of each of the spaces 56.

Next, with reference to FIGS. 10 and 11A to 11C, an explanation shall be given of a case in which the partition member 54 is formed at the boundary portion C of the evaporator 18 by using the aforementioned filling tool 160. In this case, in the evaporator 18, the first and second fins 38a, 38b are affixed beforehand between the first and second tubes 36a, 36b by welding or the like, such that the spaces 56 are provided between the first fins 38a and the second fins 38b.

Initially, a preparatory condition is setup in which the evaporator 18 is mounted on an upper portion of an operation plate 172. As a result thereof, the lower surface side of the evaporator 18 is sealed, so that even if the packing agent L is filled therein, leakage of the packing agent L from the lower side does not occur.

Thereafter, the filling tool 160 is moved into position upwardly of the evaporator 18 by a non-illustrated robot arm. After the supply nozzles 168 have been positionally adjusted to positions facing each of the spaces 56 of the evaporator 18, the filling tool 160 is lowered (in the direction of the arrow D) by driving the robot arm, whereby the supply nozzles 168 are inserted respectively into the spaces 56 of the evaporator 18 until reaching positions adjacent to the operation plate 172.

Figure 10:
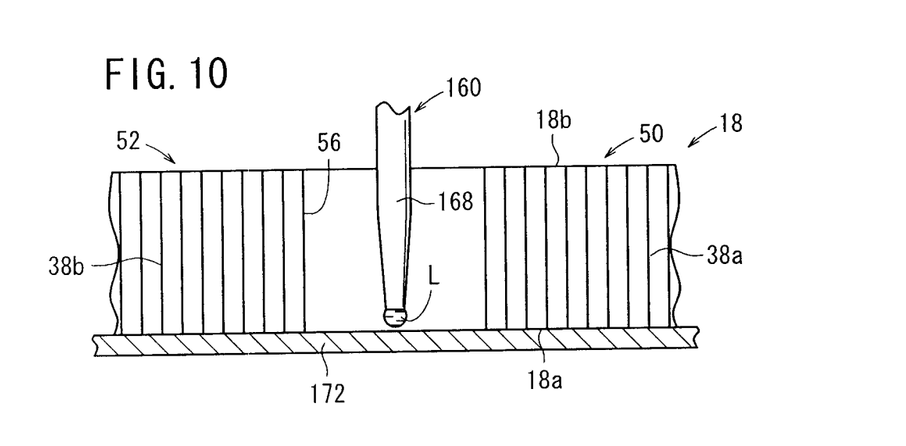
FIG. 10 is a schematic enlarge cross sectional view showing a preparatory condition in which a nozzle of the filling unit is inserted into a space of the evaporator.
Figure 11A:
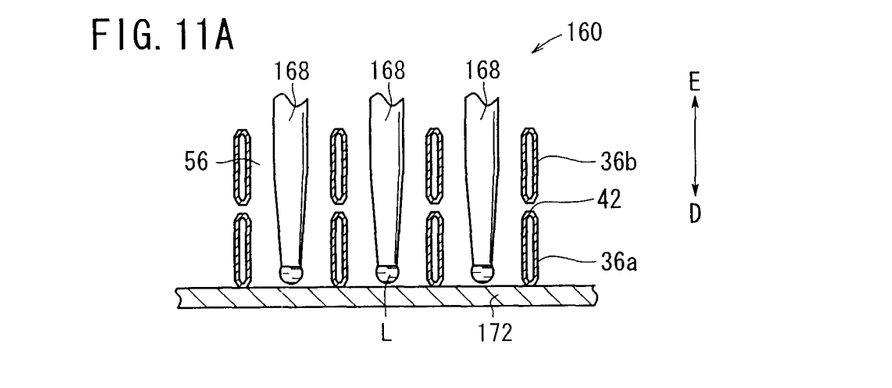
FIG. 11A is an enlarged cross sectional view showing a preparatory condition before filling of the packing agent.

In addition, as shown in FIGS. 10 and 11A, after the end portions of the supply nozzles 168 have been inserted to positions adjacent to the operation plate 172, extrusion of the packing agent L, which is in a fluidic state due to heating thereof, is initiated, whereupon the packing agent L supplied from each of the supply nozzles 168 is extruded into the spaces 56 and gradually becomes retained therein upwardly from the upper surface of the operation plate 172. Further, as shown in FIG. 11B, the robot arm is controlled so that the filling tool 160 is gradually elevated (in the direction of arrow E), corresponding to the rise in the liquid surface height of the packing agent L as it is being filled into the spaces 56.

When implementing the aforementioned control, for example, by means of a control signal based on the ejected amount of the packing agent L, which is output from an unillustrated controller to a driving means that drives the robot arm, the upward movement speed and movement amount of the filling tool 160 disposed on the robot arm are controlled appropriately, so that the ends of the supply nozzles 168 constituting the filling tool 160 are displaced so as to track with the liquid surface height of the packing agent L.

Figure 11B:
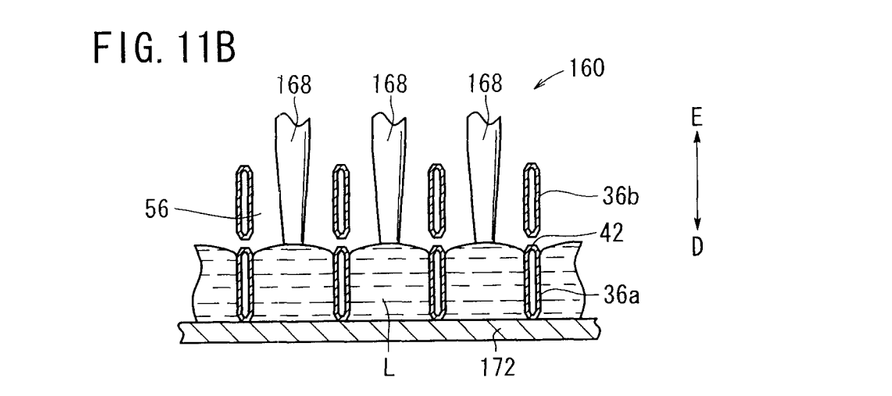
FIG. 11B is an enlarged cross sectional view showing a condition during a filling operation after filling of the packing agent from the nozzle has started.
Figure 11C:
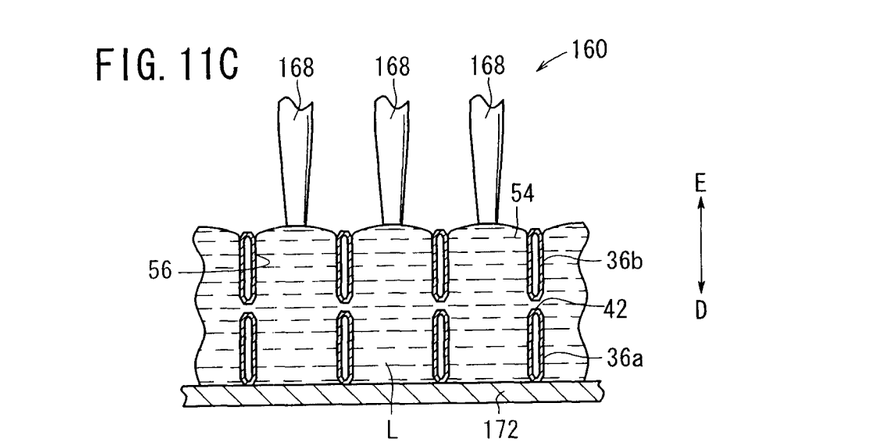
FIG. 11C is an enlarged cross sectional view showing a condition in which filling of the packing agent from the nozzle has been completed to produce a filled state by the packing agent.

As shown in FIG. 11B, while the filling tool 160 is being raised, the packing agent L is continuously ejected into the spaces 56 from the supply nozzles 168. After ejection of the packing agent L has transpired for a predetermined ejection time, ejection of the packing agent L is terminated (see FIG. 11C). In this case, since the packing agent L is ejected roughly simultaneously from the plural supply nozzles 168 with respect to each of the spaces 56, the filled amount of the packing agent L in each of the spaces 56 also is substantially the same, and along therewith, the liquid heights in each of the spaces are substantially equal and uniform. Further, the packing agent L filled into each of the spaces 56 flows into adjacent spaces 56 through the gaps 42 between the first tubes 36a and the second tubes 36b. Owing thereto, the partition member 54 created from the hardened packing agent L becomes adjoined with adjacent spaces 56 through the gaps 42 integrally.

Lastly, by leaving the aforementioned evaporator 18 to rest for a predetermined time period, the packing agent L gradually cools and becomes hardened, thereby forming the partition member 54 in intimate contact with respect to edges of the first and second fins 38a, 38b and side surfaces of the first and second tubes 36a, 36b. More specifically, the partition member 54 made up from the filled and hardened packing agent L becomes formed in the spaces 56, which are disposed at the boundary portion C between the first cooling section 50 and the second cooling section 52.

Consequently, in the evaporator 18, the partition member 54 completely fills and seals the spaces between the first fins 38a and the second fins 38b and between the first tube 36a and the second tube 36b, such that flow of air is blocked between the first fins 38a and the second fins 38b, and simultaneously, the flow of air through the gaps 42 formed between the first tubes 36a and the second tubes 36b is blocked. Thus, flow of air between the first cooling section 50 and the second cooling section 52 can reliably be blocked.

Next, operations and effects of the vehicular air conditioning apparatus 10, which utilizes a heat exchanger formed with the above-described partition member 54, shall be explained.

First, when operation of the vehicular air conditioning apparatus 10 is started, the first blower fan 120 of the first blower unit 16 is rotated by supplying electrical power thereto, and air (interior or exterior air) that is taken in through the duct 116 or the like is supplied to the first front passage 34 of the casing 12 through the connection duct 14. Simultaneously, air (interior air), which is taken in by rotation of the second blower fan 138 of the second blower unit 22 by supplying electrical power thereto, is supplied to the first rear passage 130 from the blower case 140 while passing through the second intake port 128.

In the following descriptions, air supplied to the interior of the casing 12 by the first blower fan 120 shall be referred to as "first air," and air supplied to the interior of the casing 12 by the second blower fan 138 shall be referred to as "second air."

The first air and the second air supplied to the interior of the casing 12 are each cooled by passing respectively through the first and second cooling sections 50, 52 of the evaporator 18, and flow respectively as chilled air to the second front passages 60a, 60b and the second rear passages 142a, 142b, in which the first and second air mixing dampers 66, 152 are disposed.

In the case that a vent mode, for example, is selected by a passenger for blowing air in the vicinity of the faces of passengers, the first air mixing damper 66 is rotated to an intermediate position between the third front passage 62 and the fourth front passage 64, whereupon the first air (cooled air) supplied to the third front passage 62 flows into the mixing section 68, and the first air supplied to the fourth front passage 64 is heated by passing through the heater core 20 to become heated air, and flows into the mixing section 68 through the fifth front passage 96, whereby the first cooled air and the first heated air are mixed together.

The first air (mixed air), which is made up of the cooled air and heated air mixed in the mixing section 68, passes through the sixth front passage 102 and is blown in the vicinity of the faces of passengers in the front seats in the vehicle compartment from the first vent blow-out ports 106a, 106b due to the fact that the defroster blow-out port 100 is blocked by the defroster damper 104, and that the opening of the seventh front passage 110 is blocked by the vent damper 108.

On the other hand, the second air mixing damper 152 is rotated to an intermediate position in the interior of the third rear passage 148, whereupon the second air (cooled air) supplied to the third rear passage 148 is heated by passing through the heater core 20 to become heated air, and flows to the downstream side through the fourth rear passage 150. Together therewith, cooled second air is supplied directly into the fourth rear passage 150 from the opening of the third rear passage 148, is mixed together with the heated second air, and flows to the downstream side.

In addition, under a switching action of the mode switching damper 158, the second air (mixed air) passes through the fifth rear passage 154 and is blown in the vicinity of the faces of passengers in the middle seats in the vehicle compartment from the second vent blow-out port (not shown).

Next, in the case that a bi-level mode is selected for blowing air in the vicinity of the faces and feet of passengers in the vehicle compartment, the first air mixing damper 66 is rotated somewhat toward the side of the third front passage 62, whereas the vent damper 108 is placed in an intermediate position, rotated somewhat to the side of the first vent blow-out ports 106a, 106b compared to the case of the vent mode. Additionally, the cooled first air that has passed through the evaporator 18 is supplied directly into the mixing section 68 via the bypass passage 70, is mixed in the mixing section 68 with the first air (mixed air) that is supplied through the third and fifth front passages 62, 96, and is blown in the vicinity of the faces of passengers from the first vent blow-out ports 106a, 106b.

Further, a portion of the first air (mixed air), which flows to the sixth front passage 102 from the mixing section 68, passes through the sixth and seventh front passages 102, 110 and is supplied respectively to the first and second heat passages 112, 114, whereby the air is blown in the vicinity of the feet of passengers in the front and middle seats in the vehicle compartment from the first and second heat blow-out ports (not shown).

At the same time, the second air mixing damper 152 is rotated somewhat in a direction away from the heater core 20, and the mode switching damper 158 is rotated from the position closing the sixth rear passage 156 to an intermediate position between the fifth rear passage 154 and the sixth rear passage 156. In addition, as for the second air, heated air heated by the heater core 20 and cooled air, which is supplied to the fourth rear passage 150 through the opening from the third rear passage 148, are mixed together and blown as mixed air from the fifth rear passage 154, through the second vent blow-out port, and in the vicinity of the faces of passengers riding in the middle seats in the vehicle compartment, while also being blown from the sixth rear passage 156, past the third and fourth heat blow-out ports, and in the vicinity of the feet of passengers riding in the middle and rear seats in the vehicle compartment.

Next, in the case that the heat mode is selected for blowing air in the vicinity of the feet of passengers in the vehicle compartment, the first air mixing damper 66 is rotated further to the side of the third front passage 62 compared to the case of the bi-level mode, while the defroster damper 104 and the vent damper 108 are rotated respectively to block the defroster blow-out port 100 and the first vent blow-out ports 106a, 106b. Consequently, the first air (mixed air), which was mixed in the mixing section 68, passes through the sixth and seventh front passages 102, 110 and flows rearwardly to be supplied respectively to the first and second heat passages 112, 114, and is blown in the vicinity of the feet of passengers in the front and middle seats in the vehicle compartment from the non-illustrated first and second heat blow-out ports.

On the other hand, the second air mixing damper 152 is rotated further toward the side of the opening compared to the case of the bi-level mode, and further, the mode switching damper 158 is positioned to block the fifth rear passage 154. Consequently, the second air (mixed air), which was mixed in the fourth rear passage 150, passes from the fourth rear passage 150, through the sixth rear passage 156, and is supplied to the third and forth heat blow-out ports, whereby the air is blown in the vicinity of the feet of passengers in the middle and rear seats in the vehicle compartment.

Next, an explanation shall be made concerning a heat-defroster mode for blowing air in the vicinity of the feet of passengers in the vehicle compartment, as well as for blowing air in the vicinity of a front window for eliminating fog (condensation) from the front window. In the event that the heat-defroster mode is selected, the defroster damper 104 is rotated in a direction to separate from the defroster blow-out port 100, so as to assume an intermediate position between the defroster blow-out port 100 and the opening of the sixth front passage 102, and together therewith, the first vent blow-out ports 106a, 106b are blocked by the vent damper 108 (i.e., the condition of the two-dot-dash line shown in FIG. 2).

Consequently, a portion of the first air (mixed air), which was mixed in the mixing section 68, passes through the defroster blow-out port 100 and is blown in the vicinity of the front window of the vehicle, while another portion of the first air flows past the sixth and seventh front passages 102, 110 and is blown in the vicinity of the feet of passengers in the front and middle seats in the vehicle compartment from the first and second heat passages 112, 114 and the first and second heat blow-out ports (not shown).

Further, in the heat-defroster mode, in the case that second air is blown toward the middle seats and rear seats of the vehicle compartment, since this mode is the same as the heat mode discussed above, detailed explanations thereof shall be omitted.

Lastly, the defroster mode for blowing air only in the vicinity of the front widow for eliminating fog (condensation) from the front window in the vehicle shall be described. In this case, the defroster damper 104 is rotated to separate from the defroster blow-out port 100 while the opening of the sixth front passage 102 is blocked, and the first air (mixed air) is supplied from the mixing section 68 to the opened defroster blow-out port 100 and is blown in the vicinity of the front window in the vehicle. In this case, the defroster mode can be handled solely by blowing first air supplied only from the first blower unit 16, without driving the second blower unit 22.

In accordance with the above-described embodiment, a structure has been explained in which the partition member 54 is formed from a filled packing agent L at the boundary portion C between the first cooling section 50 and the second cooling section 52 that make up the evaporator 18. However, the present invention is not limited by this feature. For example, the partition member 54 may also be applied as a partitioning means disposed at a boundary portion between the first heating section 74 and the second heating section 76 in the heater core 20. In this case, for the packing agent L, a resin material is adopted having a melting point that is higher than the temperature of the heated water that flows through the interior of the heater core 20.

In the foregoing manner, according to the present invention, the spaces 56 disposed between the first cooling section 50 and the second cooling section 52 in the evaporator 18 are filled with a packing agent L made up from a resin material, rubber or the like, and by hardening of the packing agent L, the partition member 54 is formed. As a result thereof, in the evaporator 18, flow of air between the first cooling section 50 and the second cooling section 52 can easily and reliably be blocked by the partition member 54. More specifically, the packing agent L fills and seals the area between the first cooling section 50 and the second cooling section 52, whereby airtightness (i.e., the hermetic condition) between the first cooling section 50 and the second cooling section 52 can be enhanced.

Consequently, by filling and hardening of the packing agent L to form the partition member 54 between the first cooling section 50 and the second cooling section 52, air that passes through the first cooling section 50 and air that passes through the second cooling section 52 are prevented from intermixing inside the evaporator 18. Owing thereto, air that is supplied from the first blower unit 16 can be made to flow through the first cooling section 50 of the evaporator 18 and to the downstream side at a desired flow rate, whereas air that is supplied from the second blower unit 22 can be made to flow through the second cooling section 52 of the evaporator 18 and to the downstream side at a desired flow rate, thus enabling mixed air, which is adjusted separately and independently in temperature, to be blown respectively and independently to the front, middle and rear seats in the vehicle compartment.

Further, by means of a simple operation, whereby the packing agent L, which is made from a resin material, rubber or the like, is filled and hardened between the first fins 38a constituting the first cooling section 50 and the second fins 38b constituting the second cooling section 52, secure partitioning of the first cooling section 50 and the second cooling section 52 is made possible.

Furthermore, because the packing agent L that makes up the partition member 54 possesses fluidity upon filling (heating) thereof, the packing agent L suitably and reliably is arranged in intimate contact with respect to side surfaces of the first and second tubes 36a, 36b and edges of the first and second fins 38a, 38b that encompass the spaces 56. In addition, since the packing agent L flows into and reliably seals the gaps 42 between the first tubes 36a and the second tubes 36b, the first cooling section 50 including the first fins 38a and the second cooling section 52 including the second fins 38b can be more reliably partitioned by means of the partition member 54 formed from the hardened packing agent L, so that flowing of air mutually between the first and second cooling sections 50, 52 can be prevented.

The heat exchanger for use in a vehicular air conditioning apparatus and the partitioning method for such a heat exchanger according to the present invention are not limited to the above-described embodiments, and it is a matter of course that various modified or additional structures could be adopted without deviating from the essence and gist of the invention as set forth in the appended claims.

What is claimed is:

1. A heat exchanger for use in a vehicular air conditioning apparatus, the heat exchanger comprising:

a first surface and a second surface disposed in parallel to each other, the heat exchanger heating or cooling air by passing air through the first surface and then the second surface or vise versa;

a plurality of first and second tubes through which a medium flows in the interior of the plurality of the first and second tubes, the plurality of first tubes forming the first surface, and the plurality of second tubes forming the second surface, wherein the heat exchanger comprises a plurality of gaps between the plurality of first tubes and the plurality of second tubes;

a first heat exchanger section, a boundary portion, and a second heat exchanger section arranged in this order in a direction parallel to directions of the plurality of the first and second tubes, the boundary portion extending in a direction perpendicular to a direction in which the plurality of first and second tubes extend;

a plurality of first fins disposed on the first heat exchanger section and a plurality of second fins disposed on the second heat exchanger section, the plurality of the first and second fins being bent in a wavy shape between the plurality of the first and second tubes and having air holes in the plurality of the first and second fins through which the air flows, wherein no fins are disposed in the boundary portion; and a partition member, which is formed in the boundary portion between the plurality of the first and second tubes and at the plurality of the gaps between the plurality of the first tubes and the plurality of the second tubes, wherein the partition member is made of a liquid deposited synthetic resin or rubber that hardens into the partition member and in contact with the plurality of the first and second tubes, end surfaces of the plurality of the first fins at the boundary portion, and end surfaces of the plurality of the second fins at the boundary portion, the end surfaces of the plurality of the first and second fins being perpendicular to a direction in which the plurality of the first and second tubes extend, such that the partition member blocks the air from flowing between the first heat exchanger section and the second heat exchanger section.

2. The heat exchanger according to claim 1, wherein the partition member is formed in a direction perpendicular to a direction in which the plurality of the first and second tubes extend.

3. The heat exchanger according to claim 2, wherein the partition member is made from a thermoplastic resin that exhibits fluidity when heated and becomes solidified when cooled.

4. The heat exchanger according to claim 1, wherein the partition member is formed at a plurality of spaces between the plurality of the first and second tubes and materials of the partition member at the plurality of the spaces are connected to each other by the plurality of the gaps.

5. The heat exchanger according to claim 4, wherein the materials of the partition member at the plurality of the spaces respectively have first partition member surfaces at the first surface of the heat exchanger and second partition member surfaces at the second surface of the heat exchanger, the first partition member surfaces respectively are flat, and the second partition member surfaces respectively are curved convexly outward.

6. The heat exchanger according to claim 1 further comprising:
a first and second tanks disposed ends of the plurality of the first and second tubes, wherein the partition member is not in contact with the first and second tanks.

7. The heat exchanger according to claim 6, wherein the first tank, the first heat exchanger section, the boundary portion, the second heat exchanger section, and the second tank are arranged in this order in a direction parallel to directions of the plurality of the first and second tubes.

8. A method of making the partition member of the heat exchanger of claim 1, the method comprising:
inserting a nozzle for filling of a packing agent into a space that is formed between the first heat exchanger section and the second heat exchanger section;
filling the packing agent from the nozzle into the space, together with gradually raising the nozzle so as to separate away from the packing agent as the packing agent is filled into the space; and
causing the packing agent, which has been filled into the space, to harden so as to form a partition member that partitions the first heat exchanger section and the second heat exchanger section.

9. The method according to claim 8, wherein the space comprises a plurality of spaces, and the packing agent is filled into the plurality of spaces simultaneously and at substantially the same amount.

10. A vehicular air conditioning apparatus comprising:
a casing including first and second passages through which air flows; and
a damper mechanism for switching a flow state of the air in the first and second passages;
first and second blowers for supplying air respectively to the interior of the casing; and
the heat exchanger according to claim 1 disposed in the interior of the casing so as to straddle between the first passage and the second passage, for thereby cooling and heating the air and supplying the air.

* * * * *